United States Patent [19]

Fukui et al.

[11] 4,256,075
[45] Mar. 17, 1981

[54] FUEL FEED DEVICE FOR ENGINE

[75] Inventors: Toyoaki Fukui, Katsuragoshomachi; Tatsuro Nakagami, Kyoto; Norio Endo, Kameoka; Takao Miki, Himeji; Takashi Ishida, Oimachi, all of Japan

[73] Assignees: Mitsubishi Jidosha Kogyo Kabushiki Kaisha; Mitsubishi Denki Kabushiki Kaisha; Mikuni Kogyo Kabushiki Kaisha, all of Tokyo, Japan

[21] Appl. No.: 56,514

[22] Filed: Jul. 11, 1979

[30] Foreign Application Priority Data

Jul. 13, 1978 [JP] Japan .................. 53-85356

[51] Int. Cl.³ .................................................. F02B 3/00
[52] U.S. Cl. .................................. 123/478; 123/463; 123/483
[58] Field of Search .......... 123/127, 139 AW, 32 EA, 123/32 EF, 32 F, 32 AE, 478, 483, 463

[56] References Cited

U.S. PATENT DOCUMENTS

| | | | |
|---|---|---|---|
| 3,036,564 | 5/1962 | Guiot | 123/32 EA |
| 3,677,236 | 7/1972 | Moss | 123/32 AE |
| 3,788,285 | 1/1974 | Gelin | 123/32 EA |
| 3,960,118 | 6/1976 | Konomi | 123/127 |
| 4,002,152 | 1/1977 | Hoshi | 123/32 EA |
| 4,132,204 | 1/1979 | Teague | 123/127 |
| 4,140,088 | 2/1979 | Vulpillieres | 123/32 EA |

FOREIGN PATENT DOCUMENTS 51-118816  9/1976  Japan .................. 123/119 EC

Primary Examiner—Ronald B. Cox
Attorney, Agent, or Firm—Robert E. Burns; Emmanuel J. Lobato; Bruce L. Adams

[57] ABSTRACT

A fuel feed device for an engine capable of electronically controlling the fuel feed rate corresponding to the suction air flow rate in the intake passage, comprising an air flow rate detecting device for generating electric signals of frequencies proportional to suction air rate, a plurality of electromagnetic valves with a different fuel passage section from one another disposed at a suitable position in the intake passage and adapted so as to permit supplying through a fuel pressure regulator the fuel of a fixed pressure differential with the suction pressure near a fuel outlet, and an electric control means for driving the electromagnetic valves selectively in synchronism with or to follow the frequency of the electric signals or a divided frequency thereof in accordance with the engine operating condition. Thus an accurate and highly reliable fuel supply is achieved over a wide range of engine operating condition from idling to maximum speed operation.

13 Claims, 5 Drawing Figures

4,256,075

FUEL FEED DEVICE FOR ENGINE

BACKGROUND OF THE INVENTION

This invention relates to a fuel feed device for an engine provided with electromagnetic valves capable of injecting fuel into the suction pipe, more particularly, to a fuel feed device for an engine capable of electronically controlling the fuel feed rate corresponding to the suction air rate.

It is known in conventional fuel feed devices for an engine to electronically control the fuel feed rate by driving an electromagnetic valve with pulse signals based on electric signals produced by electrical conversion of the suction air flow rate.

In general, the fuel feed rate required in full throttle operation at the maximum engine speed is 30 to 40 times the fuel feed rate at the idling engine speed as the air flow rate is 30 to 40 times the air flow rate at the idling engine speed.

Consequently, in a conventional fuel feed device with a single electromagnetic valve, the pulse width of the pulse signals need to be extremely small to smoothly operate the electromagnetic valve over the wide range corresponding to the engine operation from idling operation to maximum speed operation. Furthermore, when the pulse width is reduced, a large and expensive electromagnetic valve needs to be provided to assure highly responsive operation of the electromagnetic valve.

SUMMARY OF THE INVENTION

Accordingly, an object of the present invention is to provide a fuel feed device for an engine capable of feeding fuel to the engine over the wide operating range from idling operation to maximum speed operation without requiring expensive high grade electromagnetic valves by providing a plurality of electromagnetic valves with different fuel passage cross sections from one another at a suitable location in the intake passage and by selectively changing the number and/or kind of the electromagnetic valves being used corresponding to the range of the air flow rate.

In order to attain this object, the fuel feed device for an engine according to the present invention comprises an air flow rate detecting device for generating electric signals of frequencies proportional to suction air flow rate; a plurality of electromagnetic valves with a different fuel passage section from one another disposed at a suitable location in the intake passage a fuel pressure regulator for maintaining a fixed pressure differential between the fuel feed pressure to said electromagnetic valves and the suction pressure near a fuel outlet; and electric control means for driving only an electromagnetic valve with a smaller fuel passage section in synchronism with, or following, the frequency of said electric signals or a frequency produced by dividing the frequency of the electric signals with a small division coefficient when the engine operates within a range where said air flow rate detecting device generates electric signals of lower frequencies and driving only an electromagnetic valve with a larger fuel passage section or both the electromagnetic valves with a larger and a smaller fuel passage section in synchronism with, or following, a frequency produced by dividing the frequency of said electric signals with a large division coefficient when the engine operates within a range where said air flow rate detecting device generates electric signals of higher frequencies.

BRIEF DESCRIPTION OF THE DRAWING

Explanation will be made in a fuel feed device for an engine embodied according to the present invention with reference to the accompanying drawings in which.

DESCRIPTION OF THE PREFERRED EMBODIMENT

Figure 1:
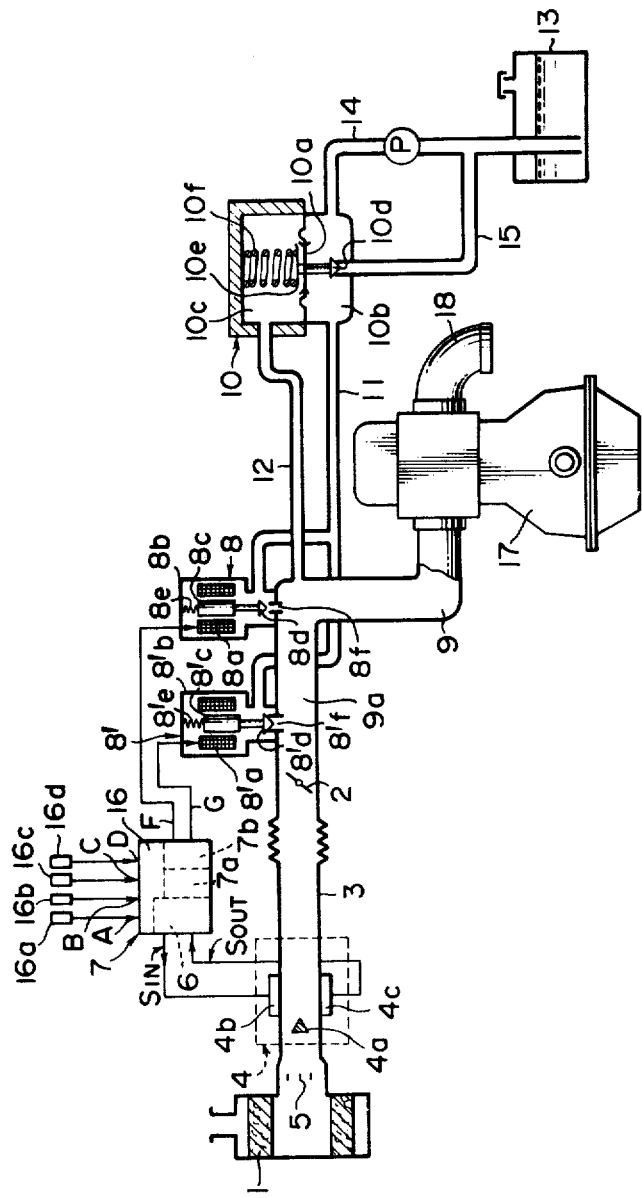
FIG. 1 is a schematic illustration of a fuel feed device of the present invention, FIG. 2-a is a graphical illustration of an output wave form of the air flow rate detecting device, FIGS. 2-b to 2-e are graphical illustrations of successions of driving pulses applied to electromagnetic valves by the electric control means.
Figure 3:
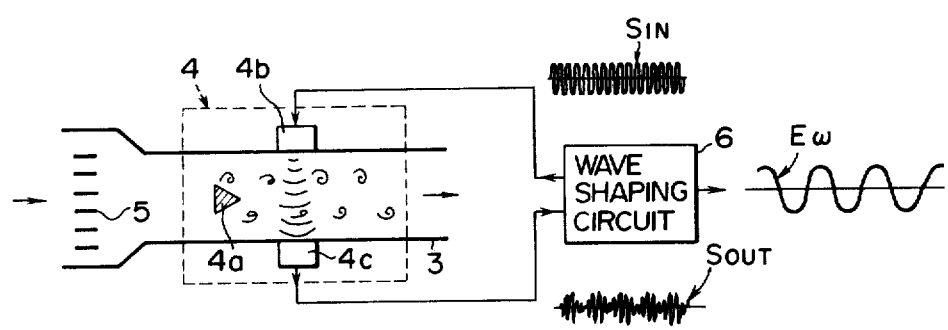
FIG. 3 is a schematic illustration for explaining the operation of the air flow rate detecting device.

Referring to FIGS. 1 and 3, an air flow rate detecting device 4 is disposed in a suction pipe 3 between an air cleaner 1 and a throttle valve 2.

The air flow rate detecting device 4 consists of a triangular prism 4a disposed perpendicularly against the suction air flowing direction, a speaker 4b functioning as an ultrasonic wave generator and a microphone 4c functioning as an ultrasonic wave receiver both disposed at the down stream side of the triangular prism 4a on the outer wall of the suction pipe 3 opposite to each other. Reference numeral 5 designates a suction air flow rectifier provided for rectifying the suction air flow and thus assuring stabilized operation of the suction air rate detecting device 4.

As the suction air rectified by the rectifier 5 streams within the suction pipe 3, nonsymmetric turbulence (Karman trail) is produced down stream of the prism 4a as illustrated in FIG. 3. It is known that the frequency produced by the turbulence is proportional to the velocity of the air flowing through the suction pipe 3 under a predetermined condition, therefore, the velocity of the air (or the volume flow rate) is detected by measuring the frequency produced by the turbulence.

Accordingly, the ultrasonic wave ($S_{IN}$) generated by the speaker 4b, under the condition that the turbulence of a frequency proportional to the velocity of the air flow is produced down stream of the prism 4a, is subjected to amplitude modulation and frequency modulation caused by the turbulence, then received by the microphone 4c. This modulated signal ($S_{OUT}$) is eliminated of higher harmonics component by a wave shaping circuit 6 including a low pass filter and others and only the modulated frequency as an envelope component is selected, thus detecting the alternate voltage signal E$\omega$ (FIGS. 2-a and 3) having a frequency proportional to the air flow velocity, that is the air volume rate, and fluctuating periodically.

This alternate voltage singal E$\omega$ is converted into a succession of pulses P$\omega$ (FIG. 2-b) synchronized with its frequency by a pulse generating circuit 7a of a microcomputer 7 employed as an electric control means.

A calculating circuit 7b detects the frequency of the succession of pulses P$\omega$ and generates a succession of driving pulses P($\omega$) of a frequency equal to the detected frequency or successions of driving pulses P($\omega$/2) or P(ω/3) of a low frequency produced by dividing the detected frequency.

An example of calculating sequence of the calculating circuit 7b will be shown hereinafter.

(1) Start (2) Succession of pulses Pω YES or NO?

(a): YES proceed to (3)

(b): NO proceed to (4)

(3) If the frequency of the pulse Pω is;

(a) 0 to 400 Hz (low air volume rate range), output is a succession of driving pulses P(ω) of a frequency equal to the input frequency from the terminal F, (b) 400 to 800 Hz (medium air volume rate range), dividing the input frequency through the dividing circuit with a division coefficient of ½ to divide the frequency of the succession of pulses Pω into ½ and output a succession of driving pulses P(ω/2) from the terminal G, (c) 800 to 1200 Hz (high air volume rate range), divide the input frequency through the dividing circuit with a division coefficient of ⅓ to divide the frequency of the succession of pulses Pω into ⅓ and output a succession of driving pulses P(ω/3) from both terminals F and G.

(4) Stop. End.

At the junction 9a of a suction manifold 9 in the down stream of the throttle valve 2, two electromagnetic valves 8 and 8', having a different fuel passage section from each other, are disposed. The fuel passage section of the electromagnetic valve 8 is half that of the electromagnetic valve 8'.

Solenoids 8a and 8'a of the electromagnetic valves 8 and 8', respectively, are connected to the terminals F and G of the micro-computer 7, respectively.

Accordingly, only the electromagnetic valve 8 having a small fuel passage section is driven at a frequency equal to the frequency of the alternate voltage signal Eω, that is the frequency of the succession of pulses Pω in the engine operating range where the frequency of the alternate voltage signal Eω is as low as 0 to 400 Hz and the air volume rate is low; only the electromagnetic valve 8' having a large fuel passage section is driven at a frequency of 200 to 400 Hz produced by dividing the frequency of the succession of pulses Pω by two in the engine operating range where the frequency of the alternate voltage signal Eω is as high as 400 to 800 Hz and the air volume rate is medium; and in the high engine operating range where the frequency of the alternate voltage signal Eω is 800 to 1200 Hz and the air volume rate is high, both of the electromagnetic valves 8 and 8' are driven at a frequency 267 to 400 Hz produced by dividing the frequency of the succession of pulses Pω by three.

Thus the operating range of the electromagnetic valves 8 and 8' are limited to under 400 Hz even in the high engine operating range.

The pulse width τ of the driving pulses P(ω), P(ω/2) and P(ω/3) are optionally determined depending on the performance of the electromagnetic valves 8 and 8'.

The electromagnetic valve 8 includes a valve case 8b, the solenoid 8a, and a plunger 8c connected to a valve case 8b by a spring 8e urging the plunger 8c in the direction that a needle valve 8d which is formed in one body with the plunger 8c closes a fuel outlet 8f.

The needle valve 8d opens the fuel outlet 8f as the plunger 8c is pulled up for a fixed stroke against the spring 8e when a succession of driving pulses produced by the microcomputer 7 is applied to the solenoid 8a of the electromagnetic valve 8 and, while the driving pulse is not applied to the solenoid 8a, the spring 8e depresses the plunger 8c to keep the fuel outlet 8f closed by the needle valve 8d.

Explanation on the manner of operation of the electromagnetic valve 8' will be omitted because it is similar to the manner of operation of the electromagnetic valve 8 except the reference numerals of the corresponding parts are attached with "'".

Figure 4:
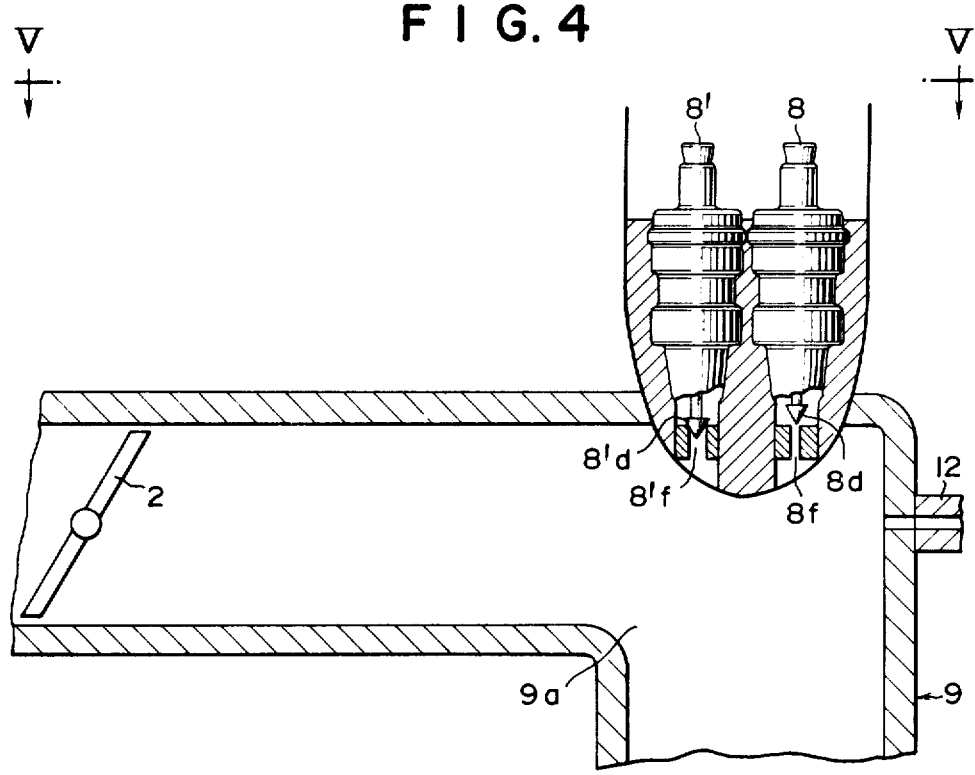
FIG. 4 is an enlarged partial longitudinal sectional view illustrating the disposition of the electromagnetic valves and FIG. 5 is a view seen in the direction V-V of FIG. 4.
Figure 5:
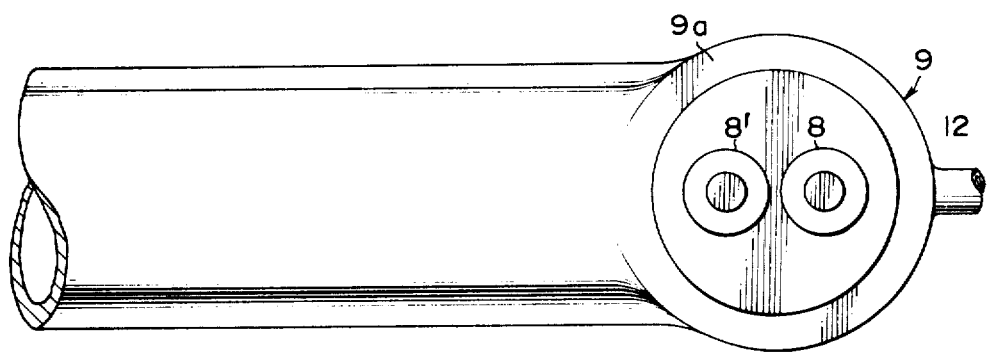

The electromagnetic valves 8 and 8' are illustrated in separate disposition in FIG. 1, however, on practice, they are disposed so that the fuel outlets are centralized at the junction 9a of the suction manifold 9 as illustrated in FIGS. 4 and 5.

A fuel pressure regulator 10 has a first chamber 10b and a second chamber 10c partitioned by a diaphragm 10a. The first chamber 10b is connected to the electromagnetic valves 8 and 8' with a fuel feed pipe 11 while the second chamber 10c is connected to an opening in the suction manifold 9 near the fuel outlets 8f and 8'f with a vacuum tube 12.

The first chamber 10b is connected also to a fuel tank 13 with a fuel feed pipe 14 having an electric fuel pump P in the line and with a fuel return tube 15.

A valve 10d, for regulating the fuel return rate by regulating the opening of the return tube 15 in the first chamber 10b, is fixed to the diaphragm 10a in the first chamber 10b. A spring 10f, provided in the second chamber 10c between the spring seat 10e formed on the diaphragm 10a and the body of the fuel regulator 10, pushes the valve 10d through the spring seat 10e and the diaphragm 10a in the direction that the valve 10d closes the opening end of the return tube 15.

When the pressure in the suction manifold 9 decreases, the pressure in the second chamber 10c also decreases so that the diaphragm 10a is pulled against the spring 10f opening the valve 10d to allow a part of the fuel to return into the fuel tank 13 through the fuel return tube 15, then the fuel pressure feeding the fuel to the electromagnetic valve 8 is reduced, thus maintaining the pressure differential between the fuel feed pressure to the electromagnetic valve 8 and the suction pressure (suction manifold vacuum pressure) near the fuel outlet.

An operating condition detecting means is provided to detect the temperature of the engine cooling water, the load condition, the acceleration and deceleration rate and the engine operating condition and to produce electric signals corresponding to those conditions.

The operating condition detecting means includes a sensor 16a for detecting the temperature of the engine cooling water, a sensor 16b for detecting the load condition of the engine, a sensor 16c for detecting the acceleration and deceleration level of the engine, a sensor 16d for detecting the oxygen density in the exhaust gas and a control circuit 16 which generates electric signals through a previously programmed arithmetic means after integrally judging the input signals received from those sensors 16a, 16b, 16c and 16d.

The control circuit 16 is included in the micro-computer 7. The input signals from the sensors 16a, 16b, 16c and 16d are fed to the control circuit 16 from the terminals A, B, C and D, then transferred to the main control circuit of the micro-computer 7.

The main control circuit modulates the predeterminate pulse width τ of the driving pulses P(ω), P(ω/2) and P(ω/3) applied to the electromagnetic valves 8 and 8' corresponding to the electric signals generated from the control circuit 16 of the engine operating condition detecting means.

The driving pulses $P(\omega)$, $P(\omega/2)$ and $P(\omega/3)$ having a pulse width thus modulated (FIGS. 2-c, -d and -e) are outputted from the terminals F and G of the micro-computer 7 and applied to the electromagnetic valves 8 and 8'.

In FIG. 1, reference numerals 17 and 18 designate the engine of a motor vehicle and its exhaust pipe, respectively.

Figure 2:
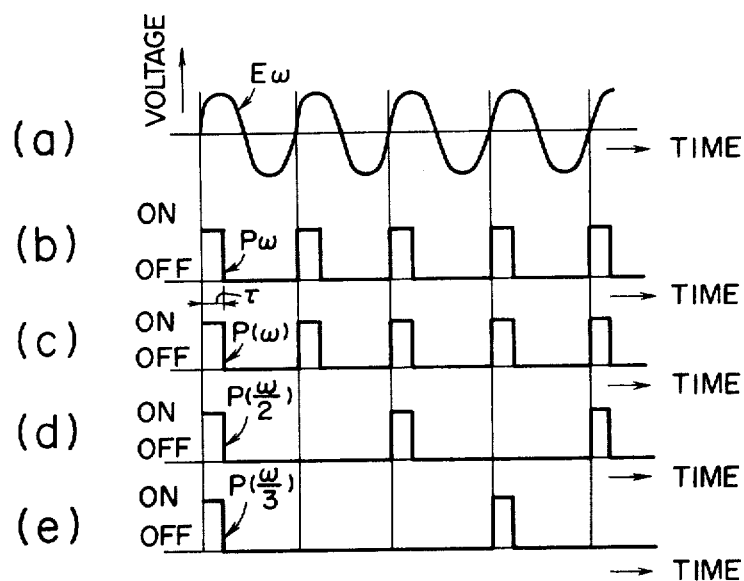

The fuel feed device for an engine of this invention being thus constituted, the air flow rate detecting device 4 converts the air flow rate, or the air volume rate, of the suction air through the air cleaner 1 into an alternate voltage signal $E\omega$ (FIG. 2-a) of a frequency proportional to the air flow velocity, then the micro-computer 7 converts the alternate voltage signal $E\omega$ into a succession of pulses $P\omega$ synchronized with the frequency of the alternate voltage signal $E\omega$ (FIG. 2-b).

Then, the succession of pulses $P\omega$ is converted into successions of pulses $P(\omega)$, $P(\omega/2)$ and $P(\omega/3)$ being operated by the calculating circuit 7b corresponding to the suction air flow rate. The succession of pulses $P(\omega)$, $P(\omega/2)$ and $P(\omega/3)$ are outputted from the terminals F and/or G and applied to the electromagnetic valves 8 and/or 8' to drive the electromagnetic valves 8 and/or 8'.

The fuel feed device of this invention assures stabilized fuel feed over the wide engine operating range from the idling to the maximum speed because the respective load on the electromagnetic valves 8 and 8' will not increase if the air flow rate through the suction pipe 3 rises as the maximum frequency of operation of the electromagnetic valves 8 and 8' is limited to 400 Hz for the frequency of the driving pulses is changed in three steps between the low air flow rate range (idling speed) and the high air flow rate range (maximum speed).

The fuel feed pressure to the electromagnetic valve 8 and 8', that is the fuel pressure in the first chamber 10b of the fuel pressure regulator 10, is controlled by the following procedure.

The differential force, between a suction force produced by the suction vacuum in the suction manifold and the spring force of the spring 10f, acting on the diaphragm 10a, opens or closes the valve 10d when the fuel pressure in the first chamber 10b is over or under the differential force, respectively, thus maintaining the fuel pressure in the first chamber 10b approximately at the level of the differential force. The fuel of a controlled pressure is fed to the electromagnetic valves 8 and 8' thus injecting the fuel into the suction manifold 9 at a fixed pressure differential from the manifold pressure according to the operation of the electromagnetic valves 8 and 8'.

In this state, when a signal is sent from a sensor 16a, 16b, 16c or 16d to the control circuit 16 corresponding to the change in the engine operating condition, the control circuit 16 sends an output signal corresponding to the input signal to the main control circuit of the micro-computer 7 where the pulse width $\tau$ of the driving pulses $P(\omega)$, $P(\omega/2)$ and $P(\omega/3)$ applied to the electromagnetic valves 8 and 8' is modulated in accordance with the electric signal given by the control circuit 16, then the modulated driving pulses are sent from the terminals F and/or G to the electromagnetic valves 8 and/or 8' to drive them.

The duration of opening of the electromagnetic valves 8 and/or 8' being thus controlled in proportion to the width of the pulses, the fuel injection rate varies corresponding to the operating condition of the engine so that the fuel injection rate is electronically controlled to maintain an optimum condition corresponding to the operating condition of the engine.

The fuel feed device according to the present invention injects into the suction manifold 9 fuel having a fixed pressure differential relative to the suction vacuum in the suction manifold 9 through the electromagnetic valves 8 and 8' controlled to operate in synchronism with the frequency of the alternate voltage signal $E\omega$ proportional to the air flow rate or the frequency produced by dividing the frequency of the alternate voltage signal $E\omega$ and furthermore, two electromagnetic valves 8 and 8', having a different fuel passage section from each other, are operated individually or in combination, thus assuring accurate and reliable fuel feed over a wide engine operating range from idling to the maximum speed operation of the engine by the electronic fuel feed control.

While a preferred embodiment of the invention has been described, obviously many modifications and variations of the present invention are possible in the light of the above teachings. In the preferred embodiment as described hereinbefore, two electromagnetic valves having different fuel passage section from each other in the ratio of 2 to 1 are provided and the division coefficients are 1, $\frac{1}{2}$ and $\frac{1}{3}$, however, it is to be understood that three or more electromagnetic valves may be used in combination with various modifications.

Although the electromagnetic valves are disposed down stream of the throttle valve 2 in the preferred embodiment, the electromagnetic valves may be disposed upstream of the throttle valve 2.

Resistance variation of a thermister sensor may be used for detecting the frequency of the Karman trail instead of the speaker 4b and the microphone 4c constituting the air flow detecting device 4.

In this constitution, a pair of thermister sensors are buried symmetrically in the front face of the prism 4a and connected to form two sides of a bridge circuit and a very small current is introduced to the circuit from a constant current power source. Alternate eddies produced by the flow of air cause the resistance of the pair of thermister sensors to change alternately at a frequency equal to that of the alternate eddy production, consequently, an electric signal of a frequency proportional to the air flow rate is obtained as the bridge circuit generates one cycle of aternate voltage signal upon generation of a pair of eddies.

The wave shaping circuit 6 may be provided integrally in or separately from the micro-computer 7.

In the preferred embodiment as described hereinbefore, the opening duration of the electromagnetic valves 8 and 8' is adjusted by controlling the pulse width corresponding to the operating condition of the engine, however, the fuel pressure for the electromagnetic valves 8 and 8' may be controlled corresponding to the operating condition of the engine.

Furthermore, in the preferred embodiment, the frequency of a succession of the electromagnetic valve driving pulses is produced in synchronism with the frequency of a succession of pulses produced by converting the alternate voltage signal $E\omega$, however, it is obvious that similar effect thereto is expected by constituting the device so that the electromagnetic valve driving pulses follow the succession of pulses Pω, that is, so that the electromagnetic valves are operated following the frequency of the electric signal produced by the air flow rate detecting device or the frequency produced by dividing the frequency of the electric signal.

It may well be understood from what has been described hereinbefore that the fuel feed device for an engine of the present invention has the advantage that highly reliable electronically controlled fuel feed is effected over a wide range of engine operating condition from idling to maximum speed operation as only the electromagnetic valves with a small fuel passage section are operated in a frequency synchronized with, or following, the frequency of the electric signal or the frequency produced by dividing the frequency thereof by a smaller division coefficient in the engine operating range where the frequency of the electric signal produced by the air flow rate detecting device is low while only the electromagnetic valve with a larger fuel passage section or both the electromagnetic valves with a large and a small fuel passage section are operated in synchronism with, or following, a frequency produced by dividing the frequency of the electric signal by a larger division coefficient.

What is claimed is:

1. A fuel feed device for an engine having an intake passage, comprising an air flow rate detecting means in said intake passage for generating electric signals of frequencies proportional to the suction air flow rate; a plurality of electromagnetic valve means for supplying fuel to said intake passage downstream of said air flow rate detecting means; and means for supplying fuel to said electromagnetic valves includes fuel pressure regulator means for maintaining a fixed pressure differential between the fuel feed pressure to said electromagnetic valves and the suction pressure in said intake passage near the fuel inlet thereto; said plurality of electromagnetic valve means having fuel passages of different cross sectional areas; said fuel feed device further comprising electric control means for driving only the electromagnetic valve means with a smaller fuel passage cross sectional area in synchronism with the frequency of said electric signals when the engine operates within a range where said air flow rate detecting means generates electric signals of lower frequencies, and driving at least the electromagnetic valve means with a larger fuel passage cross sectional area in synchronism with a frequency produced by dividing the frequency of said electric signals when the engine operates within a range where said air flow rate detecting means generates electric signals of higher frequencies.

2. A fuel feed device for an engine having an intake passage, comprising an air flow rate detecting means in said intake passage for generating electric signals of frequencies proportional to the suction air flow rate; a plurality of electromagnetic valve means for supplying fuel to said intake passage downstream of said air flow rate detecting means; and means for supplying fuel to said electromagnetic valves including fuel pressure regulator means for maintaining a fixed pressure differential between the fuel feed pressure to said electromagnetic valves and the suction pressure in said intake passage near the fuel inlet thereto; said plurality of electromagnetic valve means having fuel passages of different cross section areas; said fuel feed device further comprising electric control means for driving only the electromagnetic valve means with a smaller fuel passage cross sectional area in synchronism with the frequency of said electric signals when the engine operates within a range where said air flow rate detecting means generates electric signals of lower frequencies, and driving at least the electromagnetic valve means with a larger fuel passage cross sectional area to follow a frequency produced by dividing the frequency of said electric signals when the engine operates within a range where said air flow rate detecting means generates electric signals of higher frequencies.

3. A fuel feed device for an engine having an intake passage, comprising an air flow rate detecting means in said intake passage for generating electric signals of frequencies proportional to the suction air flow rate; a plurality of electromagnetic valve means for supplying fuel to said intake passage downstream of said air flow rate detecting means; and means for supplying fuel to said electromagnetic valves including fuel pressure regulator means for maintaining a fixed pressure differential between the fuel feed pressure to said electromagnetic valves and the suction pressure in said intake passage near the fuel inlet thereto; said plurality of electromagnetic valve means having fuel passages of different cross section areas; said fuel feed device further comprising electric control means for driving only the electromagnetic valve means with a smaller fuel passage cross sectional area to follow the frequency of said electric signals when the engine operates within a range where said air flow rate detecting means generates electric signals of lower frequencies, and driving at least the electromagnetic valve means with a larger fuel passage cross sectional area in synchronism with a frequency produced by dividing the frequency of said electric signals when the engine operates within a range where said air flow rate detecting means generates electric signals of higher frequencies.

4. A fuel feed device for an engine having an intake passage, comprising an air flow rate detecting means in said intake passage for generating electric signals of frequencies proportional to the suction air flow rate; a plurality of electromagnetic valve means for supplying fuel to said intake passage downstream of said air flow rate detecting means; and means for supplying fuel to said electromagnetic valves including fuel pressure regulator means for maintaining the fixed pressure differential between the fuel feed pressure to said electromagnetic valves and the suction pressure in said intake passage near the fuel inlet thereto; said plurality of electromagnetic valve means having fuel passages of different cross section areas; said fuel feed device further comprising electric control means for driving only the electromagnetic valve means with a smaller fuel passage cross sectional area to follow the frequency of said electric signals when the engine operates within a range where said air flow rate detecting means generates electric signals of lower frequencies, and driving at least the electromagnetic valve means with a larger fuel passage cross sectional area to follow a frequency produced by dividing the frequency of said electric signals when the engine operates within a range where said air flow rate detecting means generates electric signals of higher frequencies.

5. A fuel feed device for an engine according to any of claims 1, 2, 3 or 4, wherein said fuel passages of said electromagnetic valves open into said intake passage adjacent one another.

6. A fuel feed device for an engine according to claim 1, wherein said electric control means drives only the electromagnetic valve means with a smaller fuel passage cross section in synchronism with a frequency produced by dividing the frequency of the electric signals generated by said air flow rate detecting device with a smaller division coefficient within the engine operating range where the frequency of said electric signals is low, and drives at least the electromagnetic valve means with a larger fuel passage cross section in synchronism with a frequency produced by dividing the frequency of the electric signals generated by said air flow rate detecting device with a larger division coefficient within the engine operating range where the frequency of said electric signals is high.

7. A fuel feed device for an engine according to claim 6, wherein said electric control means comprises pulse generating means which generates a succession of pulses synchronized with the frequency of electric signals generated by said air flow rate detecting device, and means for dividing said succession of pulses and applying said divided pulses to said electromagnetic valve means.

8. A fuel feed device for an engine according to claim 7, including a means for modulating the pulse width of the pulses of said divided frequencies corresponding to the engine operating condition.

9. A fuel feed device for an engine according to claim 1, wherein said air flow rate detecting device comprises a prism member disposed perpendicularly against the stream of the suction air and means for defecting the air flow rate by measuring the eddy generating frequencies at the down stream side of said prism member.

10. A fuel feed device for an engine according to claim 1, wherein said fuel pressure regulator means comprises two chambers partitioned by a diaphragm, one chamber being connected through a fuel feed pipe to the outlet of a fuel feed pump and to said electromagnetic valve means and the other chamber being connected to an opening in said intake passage near said fuel inlet; a return tube for returning the fuel flowing through one of said chambers to the inlet of said fuel feed pump; a control valve provided for said return tube and driven by said diaphragm; and a spring urging said control valve in the direction to close said return tube.

11. A fuel feed device for an engine according to claim 2, wherein said electric control means is adapted to drive only the electromagnetic valve means with a smaller fuel passage cross section in synchronism with a frequency produced by dividing the frequency of the electric signals generated by said air flow rate detecting means with a smaller division coefficient when the engine operates within a range where the frequency of the electric signals is low, and so as to drive at least the electromagnetic valve means with a larger fuel passage section to follow a frequency produced by dividing the frequency of said electric signals with a larger division coefficient when the engine operates within a range where the frequency of said electric signals is high.

12. A fuel feed device for an engine according to claim 3, wherein said electric control means is adapted to drive only the electromagnetic valve means with a smaller fuel passage cross section to follow a frequency produced by dividing the frequency of the electric signals generated by said air flow rate detecting means with a smaller division coefficient when the engine operates within a range where the frequency of the electric signals is low, and to drive at least the electromagnetic valve means with a larger fuel passage cross section in synchronism with a frequency produced by dividing the frequency of said electric signal with a larger division coefficient when the engine operates within a range where the frequency of said electric signal is high.

13. A fuel feed device for an engine according to claim 4, wherein said electric control means is adapted so as to drive only the electromagnetic valve means with a smaller fuel passage cross section to follow a frequency produced by dividing the frequency of said electric signals with a smaller division coefficient when the engine operates within a range where the frequency of said electric signals is low and to drive at least the electromagnetic valve means with a larger fuel passage cross section to follow a frequency produced by dividing the frequency of said electric signals with a larger division coefficient when the engine operates within a range where the frequency of said electric signals is high.

* * * * *